July 27, 1926.
C. F. HUNTOON
BRAKE BEAM
Filed Oct. 9, 1924
1,593,765
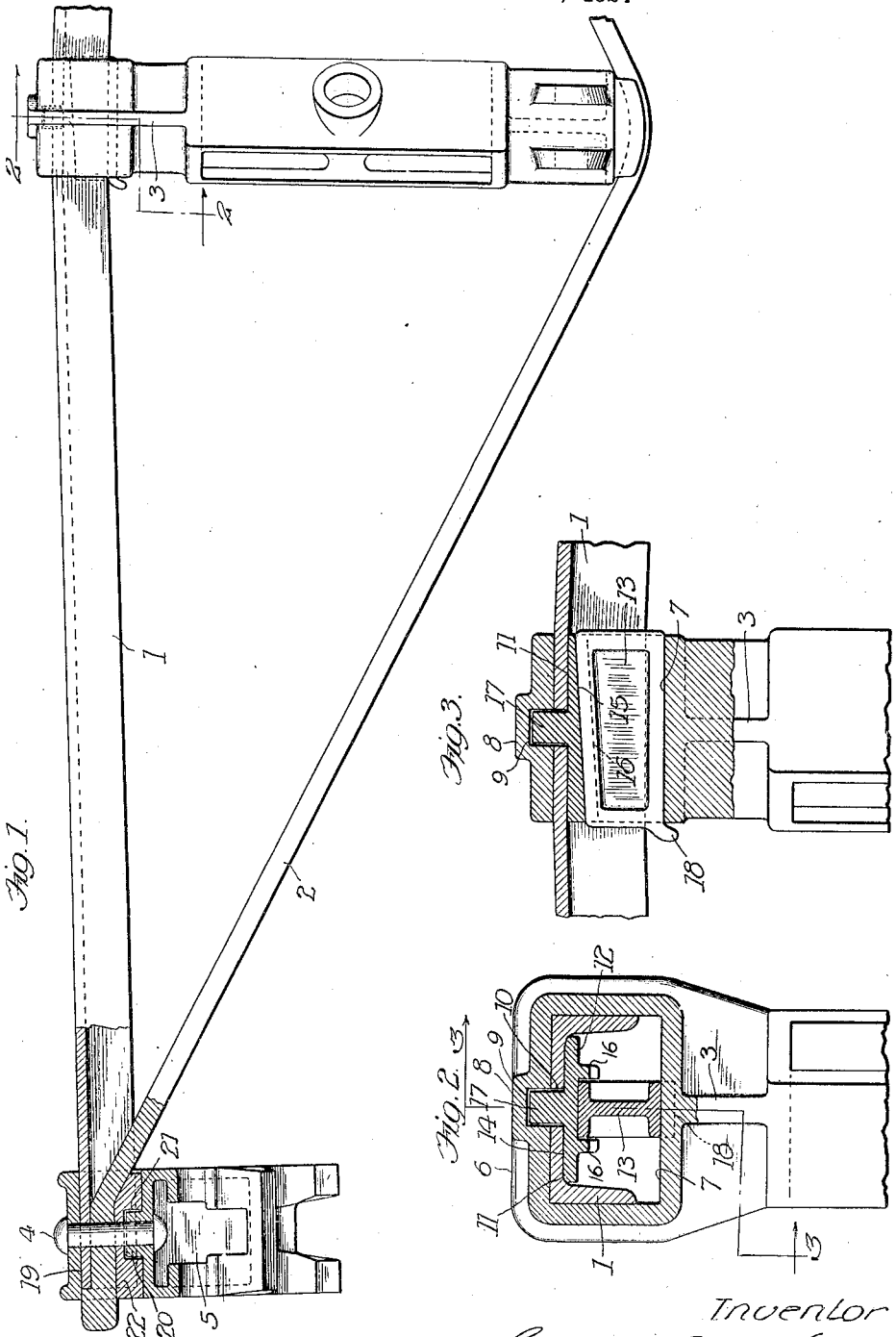

Patented July 27, 1926.

1,593,765

UNITED STATES PATENT OFFICE.

CHARLES F. HUNTOON, OF CHICAGO, ILLINOIS.

BRAKE BEAM.

Application filed October 9, 1924. Serial No. 742,584.

This invention relates to brake beams for railway cars, and more particularly to truss-shaped structures including a centrally located strut arranged between compression and tension members which are connected at their ends for supporting the brake heads which carry the usual brake shoes.

The main objects of this invention are to provide improved means for fastening the separate parts of the truss-shaped beam together so as to maintain the desired rigidity and eliminate all lost motion between the parts; to provide improved fastening means of this kind including an improved form and arrangement of filler blocks adapted for insertion between the compression member and certain other parts of the beam whereby such other parts may be combined with compression members of various sizes for constructing beams of different capacities; to provide improved means for securing the filler blocks against shifting longitudinally of the compression member; and to provide a brake beam having an improved form and arrangement of parts adapted for ready adjustment for use at either end of a car.

An illustrative embodiment of this invention is shown in the accompanying drawings, wherein—

Fig. 1 is a fragmentary plan of a brake beam to which this invention is applied, one end of the beam being shown partly in section for the sake of clearness.

Fig. 2 is an enlarged detail, partly in section, of the central part of the beam showing the improved means for connecting the strut to the compression member, this view being taken on the line 2—2 of Fig. 1.

Fig. 3 is a substantially similar view taken on the line 3—3 of Fig. 2.

The common form of brake beam is of truss-shaped construction, and comprises tension and compression members secured together at their ends and centrally separated by a strut having an apertured head through which the compression member extends. The usual brake heads are carried at the ends of the beam and are apertured so as to embrace the compression and tension members. Such truss-shaped beams are shown in my United States Patents No. 1,340,168, issued May 18, 1920, No. 1,354,650, issued October 5, 1920, and No. 1,422,863, issued July 18, 1922, and in my copending application, Serial No. 742,585, filed October 9th, 1924. In the devices shown in the above mentioned patents, a wedge is arranged in the head of the strut for clamping the strut to the compression member, so as to retain the desired rigidity of the beam. With the constructions heretofore in use, beams of different sizes and capacities have required struts varying in sizes and shapes to fit the different sizes of compression members.

A brake beam constructed in accordance with the present invention includes an improved form of filler block arranged in the head of the strut and coacting with a wedge for locking the strut to the compression member. The struts may all be of one standard size, having a head large enough to receive a compression member of maximum capacity. The filler blocks vary in thickness so as to compensate for the differences in the sizes of the compression members. The brake heads may also be of one standard size, having openings large enough to receive compression and tension members of maximum capacity. Filler blocks of various sizes are arranged in the brake heads to compensate for the differences in the sizes of the compression and tension members.

In the specific construction herein illustrated, the brake beam comprises the usual channel-shaped compression member 1 and tension member 2 separated at their medial parts by a central strut 3, and connected at their ends by rivets 4 and brake heads 5, which carry the usual brake shoes, not shown.

Formed at one end of the strut 3, is a head 6, having an opening 7 through which the compression member 1 extends. Formed in the outer extremity of the head 6, is a knob 8, which is recessed to provide a pocket 9 adapted to register with a centrally located aperture 10 formed in the web 11 of the compression member 1.

Arranged in the opening 7, and bearing between the strut 3 and the web 11 of the compression member 1, is a filler block 12 which fits within the bosom of the channel-shaped compression member and which coacts with a wedge or key 13 for locking the strut to the compression member. The filler block 12 has a flat surface 14, which bears against the web of the compression member and an inclined cam surface 15 which coacts with the opposed inclined surface of the wedge 13. Extending along opposite edges of the cam surface 15, are flanges 16 forming guide rails for guiding the movement of the wedge 13. Projecting outwardly from the block 12, is a centrally located lug or knob 17 which projects through the aperture 10 and engages the pocket 9 so as to lock the filler block 12 and strut 3 against displacement longitudinally with respect to the compression member. The filler block 12 may also be reversed in its position so as to permit the wedge 13 to be driven in from the opposite end of the opening 7. Formed on the reduced end of the wedge 13, is a lug 18, which is adapted to be bent into engagement with the adjacent edge of the strut 3 for locking the wedge 13 against withdrawal from its seat.

The brake heads 5 are all of one standard size and shape and are each provided with a transverse opening 19 which is large enough to receive compression and tension members of maximum size. Formed on the brake head 5 and projecting into the opening 19, is a centrally located boss 20 which engages a recess 21 formed in a filler block 22 which is arranged between the head 5 and the tension member 2. The heads 5 and filler blocks 22 are also centrally apertured to receive the rivets 4. The inner ends of the filler blocks 22 which bear against the tension member 2 are bevelled as shown at 23 to form inclined bearing surfaces for engaging the tension member 2. The brake heads 5 need not be made right and left but may be adapted to the respective ends of the beam by merely reversing the positions of the filler blocks.

The improved construction and arrangement of filler blocks herein shown and described effect a considerable saving in the materials and patterns over prior brake beams, in that, only one size of strut and brake head is required to be kept in stock for building beams of various capacities, the change being made in the filler block alone.

Although but certain specific embodiments of this invention have been herein shown and described, it will be understood that numerous details of the construction shown may be altered or omitted without departing from the spirit of this invention as defined by the following claims.

I claim:—

1. A brake beam comprising a member having a hollow head, a compression member extending through said head, a filler block arranged between said compression member and head, and means on said filler block having interlocking engagement with said compression member and head, for positively securing said block and first mentioned member against movement longitudinally of said compression member.

2. A brake beam comprising a strut having a head with an opening extending therethrough, a compression member extending through said opening, a filler block located in said opening and having a part thereof in interlocking engagement with said head and compression member for positively securing said block and strut against movement longitudinally of said compression member, and a wedge arranged between said filler block and strut for locking said strut to said compression member.

3. A brake beam comprising a strut having a head with an opening extending therethrough, a compression member extending through said opening, a wedge in said opening between said strut and compression member, a filler block arranged between said wedge and compression member, and a shoulder on said filler block extending through said compression member and engaging said head for positively locking said block against displacement longitudinally with respect to said member.

4. A brake beam comprising a strut having a head with an opening extending transversely therethrough, a compression member extending through said opening and having an aperture formed therein, a wedge in said opening between said strut and compression member, a filler block arranged between said wedge and compression member, and a part on said filler block engaging said aperture for locking said block against displacement longitudinally with respect to said member.

5. A brake beam comprising a strut having a head with an opening extending transversely therethrough, a compression member extending through said opening and having an aperture formed therein, said strut having a recess therein located adjacent said aperture, a filler block in said opening, a lug on said block extending through said aperture and into said recess for locking said block and strut against displacement longitudinally with respect to said compression member, and a wedge arranged in said opening between said filler block and strut.

6. A brake beam comprising compression and tension members secured together at their ends, said compression member being a channel bar having an aperture in the web thereof, a central strut having a head with an opening therein through which said compression member extends, the outer end of said head having a recess therein registering with said aperture, a filler block in said opening, a lug on said block engaging said aperture and recess for locking said block and strut against displacement longitudinally with respect to said compression member, and a wedge arranged in said opening between said filler block and strut.

Signed at Upland, Calif., this 27th day of Sept. 1924.

CHARLES F. HUNTOON.